UNITED STATES PATENT OFFICE.

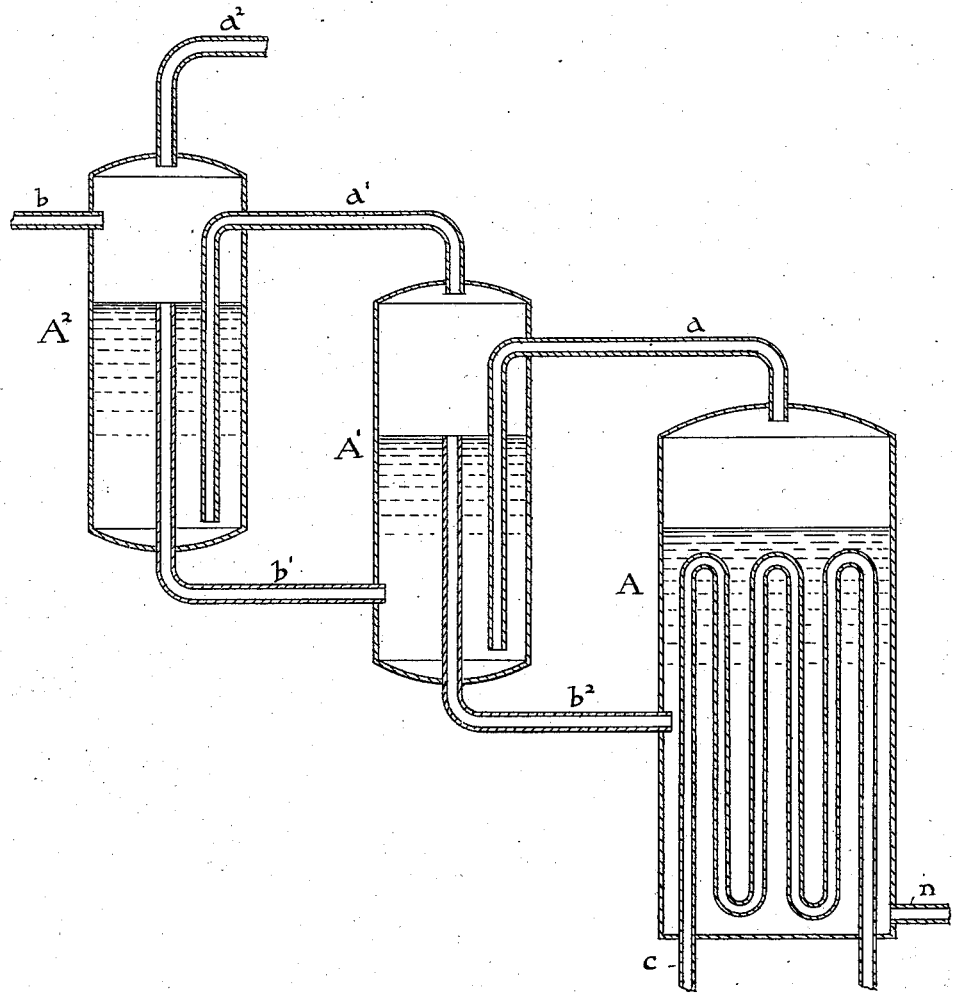

GUSTAVE O. RINMAN, OF CINCINNATI, OHIO.

PROCESS OF AND APPARATUS FOR SEPARATING AMMONIA FROM ITS SOLUTION IN THE MANUFACTURE OF ICE, &c.

SPECIFICATION forming part of Letters Patent No. 287,056, dated October 23, 1883.

Application filed June 25, 1883. (No model.)

*To all whom it may concern:*

Be it known that I, GUSTAVE O. RINMAN, of Cincinnati, Hamilton county, and State of Ohio, have invented a new and useful Improvement in Process of and Apparatus for Separating Ammonia from its Solution in the Manufacture of Ice, &c., of which the following is a full, clear, and exact specification, reference being had to the accompanying drawing, forming part of this specification, in which the figure is an elevation of my retort-tanks, with the inflow and outflow pipes thereof.

My invention relates to machinery for and a process of separating a cooling agent from its solution in a refrigerating-machine.

The usual process of refrigerating with ammonia for instance is as follows: Water is saturated with ammonia, and this solution—aqua-ammonia—is then put into a single tank and is heated. The heating device usually is a steam-pipe within the tank. The ammonia under the action of heat separates from its solution in the form of gas and passes into a condenser. This condenser usually consists of a coiled pipe in a tank of cold water. In this condenser the ammonia is by the conjoint action of the pressure from the heating-tank and the cold of the condenser changed from a gas to a liquid. The liquid ammonia passes under control as to quantity in a pipe or pipes contained within a receptacle into which the substance to be cooled is placed. The liquid ammonia, as soon as free to do so, rapidly expands in these pipes into its gaseous form, and by this expansion cools the pipes containing it. The ammonia in its gaseous form now passes to another receptacle, into which it flows. As it passes into the last receptacle it meets with and is absorbed by the water from which it was separated, which water has been taken from the lower part of the heating-tank, and is called "poor liquor," and forced through cooling-pipes to meet the ammonia-gas after the act of refrigeration has taken place. This water, having absorbed the gaseous ammonia, is known as "rich liquor," and is pumped back into the heating-tank from which it came. It will be seen that the efficiency of the process of refrigeration depends on the completeness of the separation of the ammonia from the water of its solution.

My invention is designed to make a more complete separation of the ammonia from the water at its solution than is made by the devices and process in ordinary use; and it consists of a series of tanks interposed between the usual single heating-tank and the condenser of a refrigerating-machine.

My tanks are constructed and connected as follows, reference being had to the accompanying drawing, forming part of this statement of invention: A heating-tank, A, is fitted with steam heating-pipes within it, (it, however, may be heated in any other suitable way,) and has leading from its top a gas-conduit pipe, $a$, for the escape of the products of distillation. It has also near the bottom an outlet-pipe, $n$. This conduit-pipe $a$ leads to and into a second tank, A', and extends nearly to the bottom of said tank. From the top of tank A' a pipe, $a'$, passes over to and into another tank, $A^2$, and extends nearly to its bottom. There may be as many such tanks so connected by pipes as may be found useful in practice, and none of these tanks, except the first or heating tank, A, are furnished with heating devices, the heat being wholly furnished by the heating devices of said tank A. From the last tank, $A^2$, an escape-pipe, $a^2$, leads to the usual condenser of a refrigerating-machine. The tank $A^2$ has on one side, near its top, a return-pipe, $b$, through which the "rich water" returns into the tanks. An overflow-pipe, $b'$, within said tank $A^2$, and having its open end above the end of pipe $a'$, passes out of the bottom of tank $A^2$ and into tank A'. Within the tank A' is a similar pipe, $b^2$, similarly related to pipe $a$, and passing through the bottom of tank A' into the heating-tank A.

My tanks are used as follows: Aqua-ammonia of the usual strength is put into the heating-tank A. Heat is applied to the solution in any of the ordinary ways. I have shown in the drawing steam-pipes $e$ for this purpose. Aqua-ammonia is also put into tanks A' and $A^2$, so that said tanks are filled to the top of the overflow-pipes $b^2$ and $b'$. Now, when the heat is applied to the solution in the heating-tank A, the ammonia in the form of gas passes from the tank A through the pipe $a$ into the tank A'. It escapes from the pipe $a$ in a heated condition, and rises through the solution in tank A′ to the upper part of said tank. The aqua-ammonia in the tank A′ is thus heated, and a certain percentage of its ammonia is liberated in the form of gas, to pass, together with the gas escaping from tank A, into tank A² through pipe a′, to escape, after passing through and heating the aqua-ammonia in tank A², to a condenser through pipe a². A certain proportion of the ammonia in the solution in tank A² is thus separated from its water. The rich liquor returns to the heating-tank A through the pipes b, b′, and b² and the tanks A² and A′, and the poor liquor passes out of the tank A by way of the pipe n, whence it is forced to the absorber, where it meets with and absorbs the ammonia, and is thus converted into rich liquor. It will be seen that the water on the return reaches the tank A deprived of a portion of its ammonia, and the heat has less ammonia to liberate, and therefore the water which escapes at n is poorer in ammonia than it would be from a single tank as ordinarily worked.

In my process a larger per cent. of the ammonia held in solution is effective for refrigeration than in the ordinary single-tank absorption process.

Having thus described my invention, what I claim as new, and desire to secure by Letters Patent, is as follows:

1. In a refrigerating-machine using ammonia as the cooling agent, the combination of two or more retort-tanks, to one of which only heat is directly applied, substantially as described.

2. In a refrigerating-machine, the combination of a retort-tank to which heat is directly applied, a supplementary tank, and the pipes connecting said tanks, substantially as described.

3. In a refrigerating-machine, the process of separating the cooling agent from the water of its solution by means of two or more retort-tanks in which said solution is subjected to heat, the heat being applied to the solution in one of these tanks directly by means of heating devices, and in the others by means of the passage through it of the heated products of distillation from the heated tank, substantially as described.

The foregoing specification of my invention signed by me this 20th day of June, A. D. 1883.

GUSTAVE O. RINMAN.

Witnesses:
JEPTHA GARRARD,
PHILIP S. GOODWIN.